United States Patent
Hunter et al.

(10) Patent No.: US 11,188,926 B2
(45) Date of Patent: Nov. 30, 2021

(54) UNIQUE PART AUTHENTICATION

(71) Applicant: Applied Materials, Inc., Santa Clara, CA (US)

(72) Inventors: Earl Hunter, Lakeway, TX (US); David Ganon, Raanana (IL); Amitabh Puri, San Jose, CA (US); Gerard Crean, Round Rock, TX (US)

(73) Assignee: Applied Materials, Inc., Santa Clara, CA (US)

(*) Notice: Subject to any disclaimer, the term of this patent is extended or adjusted under 35 U.S.C. 154(b) by 231 days.

(21) Appl. No.: 16/412,146

(22) Filed: May 14, 2019

(65) Prior Publication Data
US 2019/0370821 A1    Dec. 5, 2019

Related U.S. Application Data

(60) Provisional application No. 62/678,801, filed on May 31, 2018.

(51) Int. Cl.
| | |
|---|---|
| *G06Q 30/00* | (2012.01) |
| *G06K 7/14* | (2006.01) |
| *G06K 7/10* | (2006.01) |
| *H04L 9/06* | (2006.01) |

(52) U.S. Cl.
CPC ....... *G06Q 30/0185* (2013.01); *G06K 7/1413* (2013.01); *G06K 2007/10504* (2013.01); *H04L 9/0643* (2013.01)

(58) Field of Classification Search
CPC ............. G06Q 30/0185; G06K 7/1413; G06K 2007/10504; H04L 9/0643; H04L 9/3226; H04L 9/0866
See application file for complete search history.

(56) References Cited

U.S. PATENT DOCUMENTS

| | | |
|---|---|---|
| 2005/0289061 A1 | 12/2005 | Kulakowski et al. |
| 2008/0120710 A1 | 5/2008 | Holz et al. |
| 2008/0129037 A1 | 6/2008 | Roth et al. |
| 2010/0289627 A1 | 11/2010 | McAllister et al. |
| 2011/0025458 A1 | 2/2011 | Rokhsaz et al. |
| 2017/0078841 A1* | 3/2017 | Rose, Jr. ................. F03D 17/00 |
| 2017/0193525 A1* | 7/2017 | Shah ........................ H04L 63/02 |

FOREIGN PATENT DOCUMENTS

TW            201417011 A        5/2014

OTHER PUBLICATIONS

International Search Report/Written Opinion issued to PCT/US2019/030826 dated Aug. 23, 2019.
Taiwan Office Action issued to 108118394 dated Apr. 20, 2020.

* cited by examiner

*Primary Examiner* — Matthew Mikels
(74) *Attorney, Agent, or Firm* — Patterson + Sheridan, LLP

(57) ABSTRACT

Implementations described herein generally relate to improved part authentication. In one implementation, a method includes acquiring information related to a part. The information may include identification information of the part and a unique code. The method further includes determining, using a stored algorithm, whether the unique code comprises a result of applying the stored algorithm to the identification information. The method further includes, responsive to determining that the unique code comprises the result of applying the stored algorithm to the identification information, activating a feature of the part or a feature of process equipment associated with the part.

20 Claims, 5 Drawing Sheets

UNIQUE PART AUTHENTICATION

RELATED APPLICATIONS

This application claims the benefit of U.S. Provisional Application No. 62/678,801, entitled "UNIQUE PART AUTHENTICATION," by the same inventors, filed 31 May 2018, the contents of which are incorporated herein in their entirety.

BACKGROUND

Field

Implementations described herein generally relate to improving part authentication by providing applications that generate and use unique codes for authentication of parts.

Description of the Related Art

Providers of hardware, such as tools related to the manufacture of displays or semiconductors, often provide a variety of parts to customers. In some cases, customers may acquire parts from third-party suppliers, such as spares or refurbished parts sold by entities that have no relationship to the original provider. This may present a number of issues, such as a loss of revenue for the provider, difficulty in identifying genuine parts, and an inability for the provider to collect additional data about the use of the parts by the customer, such as dates, lifetimes, and the like.

In particular, it may be difficult to authenticate "passive" parts that have no internal memory (e.g., purely mechanical parts). Without the ability to store authentication information within a part (e.g., an authentication key stored in internal memory of a part), determining the validity of the part may be difficult. As such, there is a need for improved techniques for part authentication.

SUMMARY

Implementations described herein generally relate to improved part authentication. In one embodiment, a method includes acquiring information related to a part, wherein the information comprises: identification information of the part; and a unique code. The method further includes determining, using a stored algorithm, whether the unique code comprises a result of applying the stored algorithm to the identification information; and responsive to determining that the unique code comprises the result of applying the stored algorithm to the identification information, activating a feature of the part or a feature of process equipment associated with the part.

In another implementation, a computer system is provided, which comprises a memory and a processor configured to perform a method for improved part authentication. In one embodiment, the method includes acquiring information related to a part, wherein the information comprises: identification information of the part; and a unique code. The method further includes determining, using a stored algorithm, whether the unique code comprises a result of applying the stored algorithm to the identification information; and responsive to determining that the unique code comprises the result of applying the stored algorithm to the identification information, activating a feature of the part or a feature of process equipment associated with the part.

In yet another implementation, a non-transitory computer-readable medium is provided, which comprises instructions to perform a method for improved part authentication. In one embodiment, the method includes acquiring information related to a part, wherein the information comprises: identification information of the part; and a unique code. The method further includes determining, using a stored algorithm, whether the unique code comprises a result of applying the stored algorithm to the identification information; and responsive to determining that the unique code comprises the result of applying the stored algorithm to the identification information, activating a feature of the part or a feature of process equipment associated with the part.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
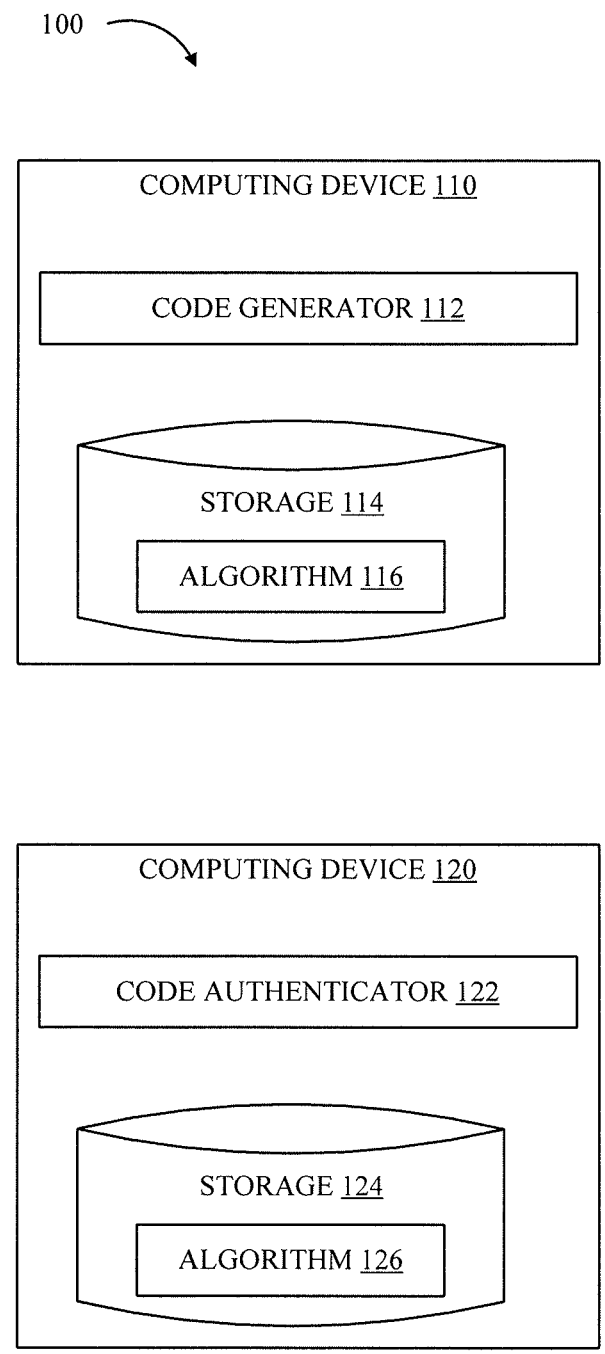
FIG. 1 depicts an example of computing devices with which embodiments of the present disclosure may be implemented.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes methods for improved part authentication. Certain details are set forth in the following description and in FIGS. 1-5 to provide a thorough understanding of various implementations of the disclosure. Other details describing well-known structures and systems often associated with parts and tools with which embodiments described herein may be implemented are not set forth in the following disclosure to avoid unnecessarily obscuring the description of the various implementations.

Many of the details, dimensions, components, and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Techniques described herein generally relate to authentication of parts. Parts may, for example, be components used in, on, or with substrate processing systems used in an electronic device fabrication (e.g., wafer fabrication) process, such as chemical mechanical polishing (CMP) systems, chemical vapor deposition (CVD) chambers, physical vapor deposition (PVD) chambers, ion implantation chambers, etch processing systems and/or chambers, photolithography processing systems, substrate thinning system (e.g. backgrind), processing systems related thereto, and other processing systems used in the manufacturing of electronic devices, such as semiconductor devices. For example, a part may be a PVD or CVD chamber, a power source such as a battery, or the like that is used with a wafer fabrication system such as a PVD or CVD system.

Authentication of parts can be challenging, particularly for parts that have no internal memory. For example, customers may acquire parts for use with manufacturing tools from third-party sources that have no relationship to the original provider of the parts. As such, the original provider may lose revenue and may be unable to track usage of the parts. Furthermore, the customer may be unable to confirm whether or not a part is genuine and appropriate for use with a particular tool.

Embodiments of the present disclosure involve applications that allow for the generation and use of unique codes to authenticate parts. In one embodiment, an application is provided that receives identification information of a part and generates a unique code for the part based on the identification information using a particular technique (e.g., a particular algorithm). For example, the application may be provided to a supplier of a part, and the supplier may enter identification information of the part into the application (e.g., via a user interface associated with the application). The identification information may include, for example, a serial number, a date (e.g., manufacturing date, refurbishment date, or the like), and a supplier identifier. In certain embodiments, the identification information may be found affixed to the part, such as on a label. In some embodiments, the identification information may be included in the form of a bar code on the part, and the bar code may be scanned by an image capture device associated with the application (e.g., a bar code scanner or camera associated with a computing device on which the application runs).

The application generates a unique code based on the identification information. For example, the application may apply an algorithm to the identification information in order to generate the unique code. The algorithm may, for example, comprise a hash function. The application outputs the unique code, which may be affixed to the part, such as on a label that is attached to the part. In some embodiments, the unique code is affixed to the part in the form of a bar code. The supplier may provide the part to a customer with the unique code and the identification information affixed to the part.

A companion application may be provided to the customer for part authentication. For example, the application may be included with a tool to which the part corresponds, and may be integrated with a user interface. In certain embodiments, the unique code and identification information of the part are entered into the application. For example, the customer may enter the unique code and identification information from a label on the part into the application via a user interface. In some embodiments, the unique code and/or the identification information may be in the form of one or more bar codes affixed to the part, and may be entered into the application by scanning the one or more bar codes using an image capture device associated with a computing device on which the application runs.

The application authenticates the part based on the unique code and the identification information. The application may store a technique (e.g., algorithm) that matches the technique used to generate the unique code. For example, the two companion applications (e.g., the application used by the supplier to generate the code and the application used by the customer to authenticate the part) may both store the same algorithm. The application authenticates the part by determining whether the unique code was generated based on the identification information using the algorithm. For example, the application may apply the algorithm to the identification information and determine whether the result matches the unique code acquired from the part. If the application determines that the unique code was generated based on the identification information using the algorithm, then the application determines that the part is authentic. Otherwise, the application determines that the part is not authentic.

One or more features of a part or equipment associated with the part may be enabled based on authentication. For example, a feature of the part or equipment associated with the part may only be activated if the part is determined to be authentic. Features related to enhanced performance, for example, may be activated if the part is authentic. In one example, a part may operate at a lower power level until it is authenticated, at which a point higher power level is activated. In another example, a part is associated with a polishing system that is locked to prevent it from performing certain types of polishing processes and/or operations prior to authenticating the part (e.g., which may be a required part for the system). After part authentication, the polishing system may engage in the previously locked polishing process and/or operations. This may ensure safety and reliability as, in some circumstances, performing certain functions and/or processes using unauthorized and/or incompatible parts may result in unsafe processing conditions and/or unreliable results.

The unique code may be stored by the application if the part is authentic in order to prevent unlicensed re-use of the unique code. For example, the unique code may be stored as an authenticated code in a storage associated with the application. If the part is determined not to be authentic, then the customer may be notified that authentication has failed, such as through a user interface associated with the application. In certain embodiments, one or more features of the part may be disabled (or not enabled if they are disabled by default) if the part is not authentic.

Once a unique code is stored as an authenticated code, any future attempt to authenticate a part using the unique code may be prevented. For example, as part of the authentication process, the application may compare a received unique code to any authenticated unique codes that are stored, and determine whether the received unique code has already been used. A unique code that has already been used may be determined not to be authentic or, in some embodiments, the customer may be provided with a notification indicating that the unique code has already been used.

It is noted that network connectivity is not required for techniques described herein. However, embodiments may be implemented with network connectivity, such as providing a customer with the ability to purchase a license for a part that is determined not to be authentic. Furthermore, if a network connection is available, authenticated unique codes may be stored in a network-accessible location in order to prevent re-use of unique codes across different tools.

Techniques described herein constitute an improvement with respect to conventional industry practices, as they allow for the authentication of parts without requiring network connectivity and without requiring the parts to have internal memory. Computing applications described herein allow for parts, such as those associated with manufacturing equipment, to be efficiently authenticated, thereby allowing suppliers to maintain control of part distribution, ensure quality control of parts, and track part usage over time (e.g., based on maintenance and part lifetime information received from customers). Preventing unauthorized distribution and re-use of parts according to techniques described herein increases market share and revenues related to parts, as well as profit margins from spares and repairs of parts. As such, the present disclosure recites a computer-based solution that utilizes computing technology in a particular way to solve a modern business challenge relating to technology.

FIG. 1 depicts an example 100 of computing devices with which embodiments of the present disclosure may be implemented. As shown, example 100 includes computing devices 110 and 120, each of which may be a computing device such as a rack server, desktop or laptop computer, mobile phone, tablet, or the like. Storage 114 and storage 124 may comprise physical storage entities or logical storage entities backed by physical storage entities.

Computing device 110 comprises a code generator 112, which may be an application that is used by a supplier of a part to generate a unique code for the part based on identification information of the part. For example, the supplier may retrieve the identification information (e.g., serial number, manufacturing date, supplier identifier, and/or the like) from the part, such as from a label affixed to the part, and enter the identification information into code generator, such as through a user interface.

Code generator 112 uses algorithm 116 in storage 114 to generate a unique code based on the identification information input into code generator 112. For example, algorithm 116 may comprise a hash function, and code generator may apply the hash function to the identification information in order to generate the unique code. Code generator 112 may output the unique code, such as through the user interface, and the supplier may affix the unique code to the part, such as on a label including a bar code. The supplier may then supply the part to a customer.

Computing device 120 comprises a code authenticator, which may be an application that is used by a customer to authenticate a part based on a unique code and identification information of a part. In one embodiment, computing device 120 is associated with a tool to which a part to be authenticated corresponds.

For example, the customer may input the unique code and identification information into code authenticator 122, such as by scanning one or more bar codes affixed to the part using an image capture device associated with computing device 120. Code authenticator 122 may use algorithm 126 in storage 124 to determine whether the unique code was generated based on the identification information using algorithm 126. Algorithm 126 is the same as algorithm 116, and this enables code authenticator 122 to determine whether the unique code was authentically generated. For example, code authenticator 122 may apply algorithm 126 to the identification information and determine whether the result matches the unique code. In the event of a match, then code authenticator 122 determines that the unique code is authentic. If there is no match, then code authenticator 122 determines that the unique code is not authentic.

Computing device 120 may perform additional operations based on whether or not the unique code is determined to be authentic. For example, one or more features of the part may be de-activated by default, and computing device 120 may activate the one or more features of the part if the unique code is authentic. If the unique code is not authentic, computing device 120 may notify the customer that authentication has failed. In certain embodiments, all features of the part are activated by default, and one or more features may be de-activated if the unique code is determined not to be authentic.

If a unique code is determined to be authentic, code authenticator 122 stores the unique code in storage 126 as an authenticated code to prevent re-use of the unique code. For example, if the customer tries to authenticate a different part using the same unique code, code authenticator 122 determines that the unique code has already been authenticated, and prevents the unique code from being used again.

In one example, a part is associated with wafer fabrication equipment (WFE). A supplier of the part uses code generator 112 as described herein to generate a unique code for the part based on identification information of the part. The unique code is then affixed to the part along with the identification information. The part is supplied to a customer, and the customer attaches the part to a piece of WFE associated with code authenticator 122. The WFE then uses code authenticator 122 to authenticate the part based on the unique code and the identification information as described herein. If the part is authenticated, one or more features (e.g., higher power, previously locked processes or operations, and/or the like) of the part or WFE are activated and the unique code is stored by the WFE as an authenticated code. If the part is not authenticated, the customer is notified that the part is not authentic, and the one or more features are not activated.

Figure 2A:
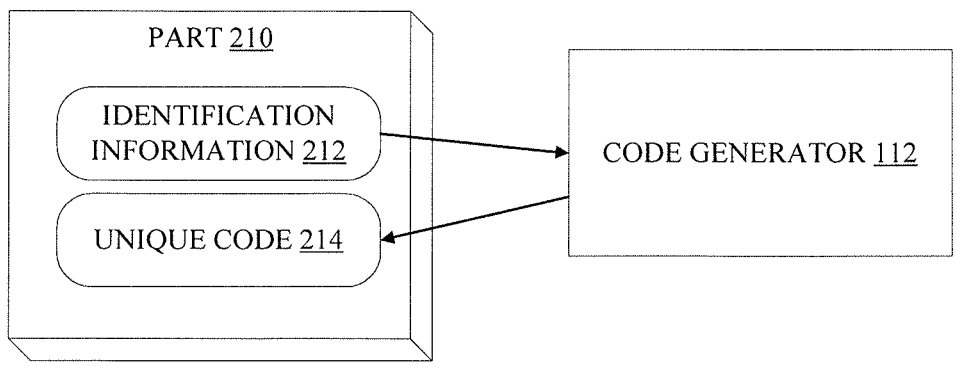
FIG. 2A illustrates an example of generating a unique code according to embodiments of the present disclosure.

FIG. 2A illustrates an example of generating a unique code according to embodiments of the present disclosure.

A part 210 (e.g., a part for a manufacturing tool) comprises identification information 212. For example, identification information 212 may comprise information that identifies part 210, such as a serial number, date, and/or supplier identifier. In some embodiments, identification information 212 is included on a label affixed to part 210.

Identification information 212 is provided (e.g., by a supplier of the part) as input to code generator 112 of FIG. 1, which outputs a unique code 214 that is generated based on identification information 212. For example, code generator 112 may apply an algorithm to identification information 212 in order to generate unique code 214. Unique code 214 may be affixed to part 210, such as on a label, by the supplier.

Part 210 may be provided with identification information 212 and unique code 214 to a customer.

Figure 2B:
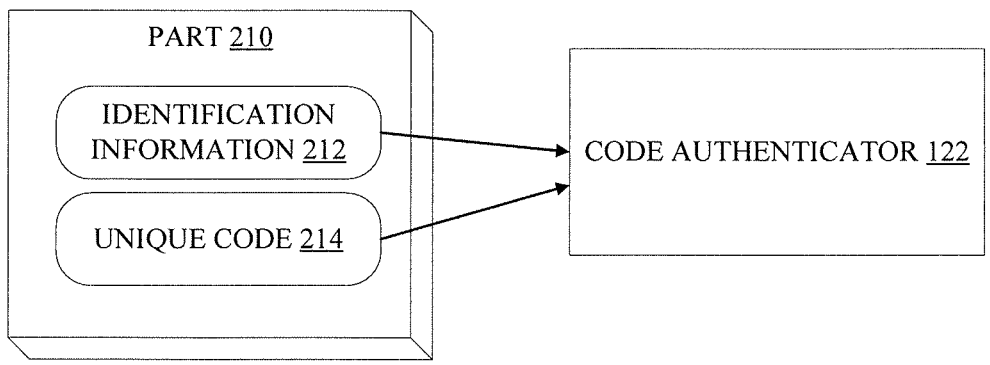
FIG. 2B illustrates an example of part authentication based on a unique code according to embodiments of the present disclosure.

FIG. 2B illustrates an example of part authentication based on a unique code according to embodiments of the present disclosure.

Part 210 (e.g., which may be the same as part 210 of FIG. 2A) comprises identification information 212 and unique code 214 (e.g., on a label affixed to part 210).

Identification information 212 and unique code 214 are provided (e.g., by a customer) as input to code authenticator 122 of FIG. 1, which performs operations related to authentication of part 210. For example, code authenticator 122 may use a stored algorithm to determine whether unique code 214 was generated based on identification information 212 using the stored algorithm, which may be the same as an algorithm of code generator 112. If code authenticator 122 determines that unique code 214 was generated based on identification information 212 using the algorithm, then code authenticator 122 determines that part 210 is authentic. Otherwise, if code authenticator 122 determines that unique code 214 was not generated based on identification information 212 using the algorithm, then code authenticator 122 determines that part 210 is not authentic.

One or more features of part 210, such as features related to enhanced performance, may be activated if code authenticator 122 determines that part 210 is authentic. Furthermore, if authentic, unique code 214 may be stored by code authenticator 122 (e.g., in a storage entity associated with code authenticator 122) as an authenticated code to prevent re-use of unique code 214. If part 210 is determined not to be authentic, then code authenticator 122 may notify the customer that authentication has failed.

Figure 3:
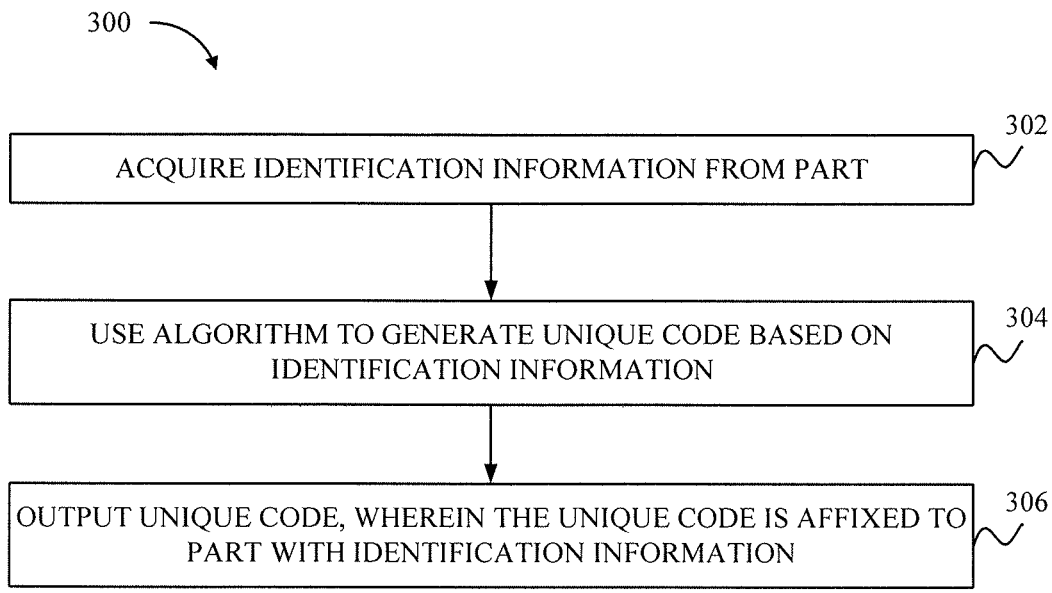
FIG. 3 illustrates example operations for generating a unique code according to embodiments of the present disclosure.

FIG. 3 illustrates example operations 300 for generating a unique code according to embodiments of the present disclosure. Operations 300 may be performed, for example, by code generator 112 of FIGS. 1 and 2A.

At 302, identification information is acquired from a part. For example, a serial number, manufacturing or refurbishment date, and/or a supplier identifier may be entered into code generator 112 by a supplier of the part.

At 304, an algorithm is used to generate a unique code based on the identification information. For example, the algorithm may be applied to the identification information in order to generate the unique code.

At 306, a unique code is output and affixed to the part. For example, code generator 112 may output the unique code in the form of a bar code, and the bar code may be affixed to the part on a label.

Figure 4:
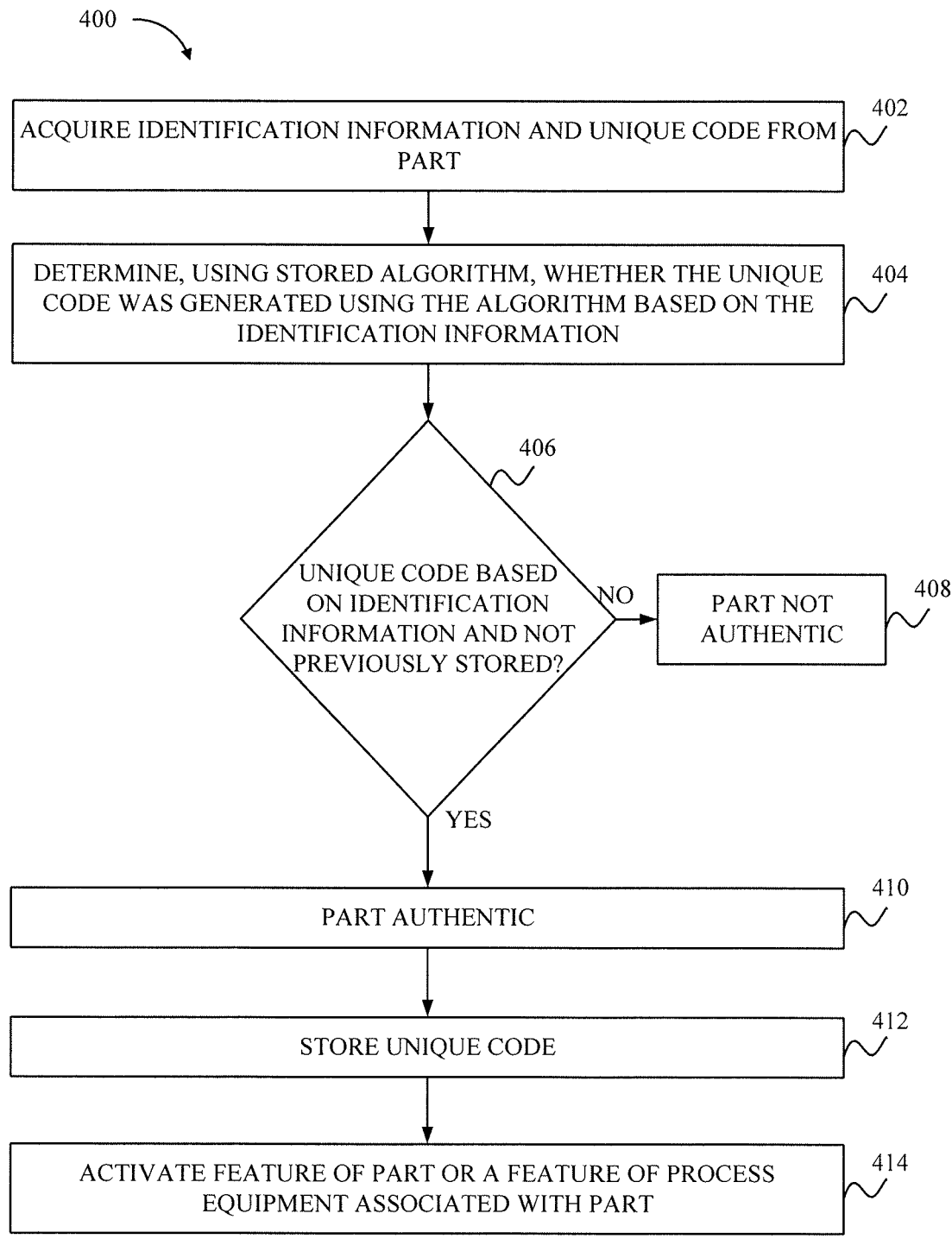
FIG. 4 illustrates example operations for part authentication based on a unique code according to embodiments of the present disclosure.

FIG. 4 illustrates example operations 400 for part authentication based on a unique code according to embodiments of the present disclosure. Operations 400 may be performed, for example, by code authenticator 122 of FIGS. 1 and 2B, and may be performed when a customer installs a part of a manufacturing tool.

At 402, the identification information and the unique code are acquired from the part. For example, the customer may use a bar code scanner or other imaging device to scan one or more bar codes affixed to the part in order to provide the identification information and unique code as input to code authenticator 122.

At 404, it is determined, using a stored algorithm whether the unique code was generated based on the identification information. For example, the stored algorithm may be applied to the identification information in order to determine whether the result matches the unique code.

At 406, if it is determined that the unique code was not generated based on the identification information or that the unique code was previously stored (e.g., indicating that the unique code has already been used), then operations continue at step 408, where it is determined that the part is not authentic. Otherwise if it is determined at 406 that that the unique code was generated based on the identification information and was not previously stored, then operations continue at step 410, where it is determined that the part is authentic.

At step 412, the unique code is stored as an authenticated code in order to prevent re-use of the unique code.

At step 414, a feature of the part or a feature of process equipment associated with the part (e.g., wafer fabrication equipment) is activated. For example, enhanced performance of the part may be activated.

It is noted that operations 300 and 400 of FIGS. 3 and 4 are only included as examples, and other combinations of operations may be performed without departing from the scope of the present disclosure.

Figure 5:
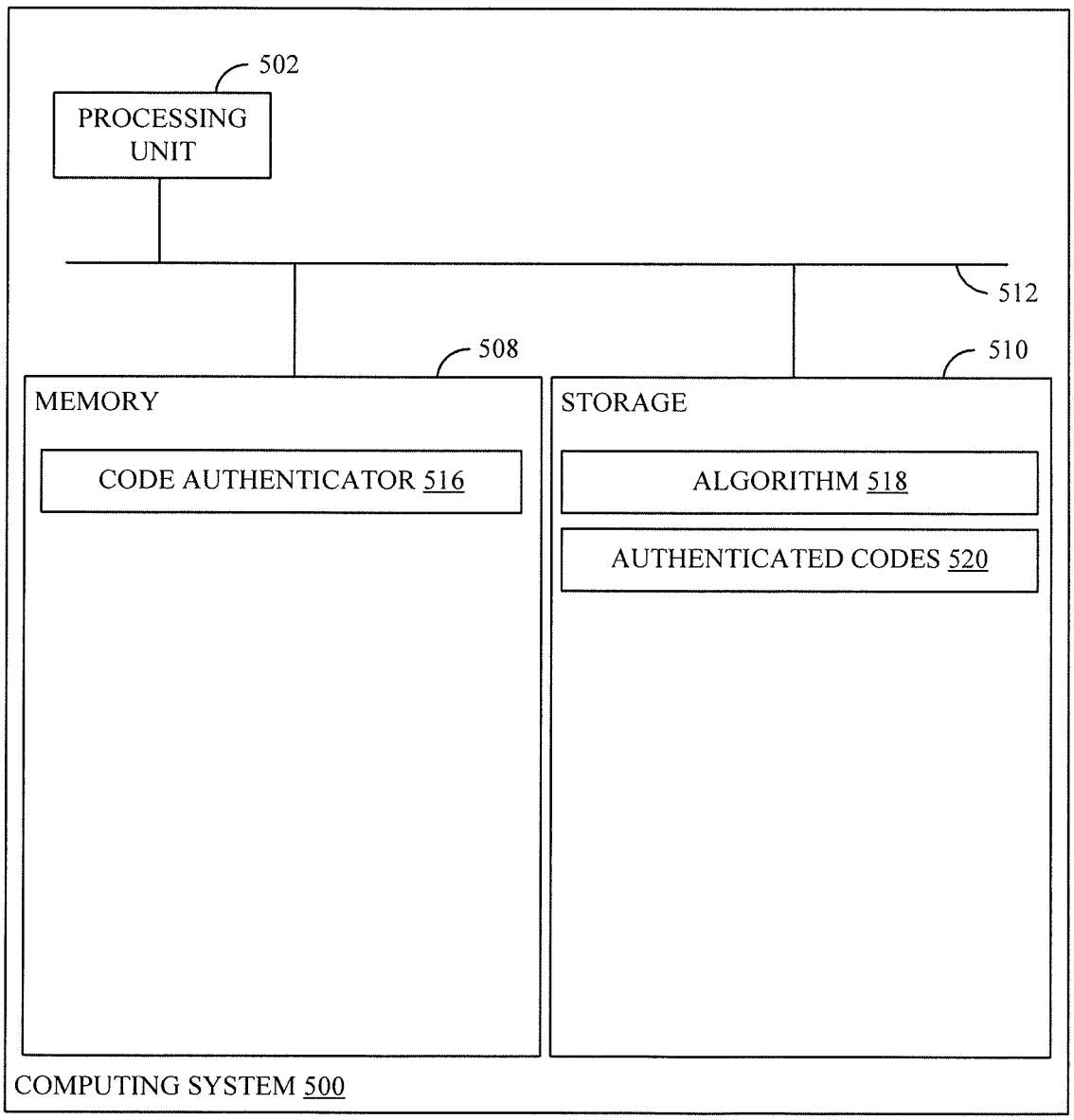
FIG. 5 depicts an example computer system with which embodiments of the present disclosure may be implemented.

FIG. 5 illustrates an example computing system 500 used to improve part authentication, according to some embodiments of the present disclosure. In certain embodiments, computing system 500 is representative of computing device 120 of FIG. 1. Aspects of computer system 500 may also be representative of other devices used to perform techniques described herein (e.g., computing device 110 of FIG. 1).

As shown, the computing system 500 includes, without limitation, a processing unit 502, a memory 508, and storage 510, each connected to a bus 512. The processing unit 502 may be a hardware or software component that executes instructions. Further, the computing elements shown in computing system 500 may correspond to a physical computing system or may be a virtual computing instance executing within a computing cloud. While not shown, computing system 500 may in some instances include an IO device interface that allows computing system 500 to connect to one or more IO devices and/or a network interface that allows computing system 500 to connect to a network such as the Internet.

The processing unit 502 retrieves and executes programming instructions stored in the memory 508 as well as stored in the storage 510. The bus 512 is used to transmit programming instructions and application data between the processing unit 502, storage 510, and memory 508. Note, processing unit 502 is included to be representative of a single processing unit, multiple processing units, a single processing unit having multiple processing cores, and the like, and the memory 508 is generally included to be representative of a random access memory. The storage 510 may be any storage entity, such as a disk drive, flash storage device, or the like. Although shown as a single unit, the storage 510 may be a combination of fixed and/or removable storage devices, such as fixed disc drives, removable memory cards, optical storage, network attached storage (NAS), or a storage area-network (SAN).

Illustratively, the memory 508 includes a code authenticator 516, which performs operations related to improving part authentication, according to techniques described herein. For example, code authenticator 516 may be equivalent to code authenticator 122 in FIG. 1, and may use algorithm 518 in storage 510 to determine whether a received unique code was generated based on received identification information, and whether the received unique code is therefore authentic. If a unique code is found to be authentic, code authenticator 516 stores the unique code as an authenticated code 520 in storage 510. In certain embodiments, one or more features of the part may be activated if the part is authentic.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to embodiments of the present disclosure, other and further embodiments of the disclosure may be devised without departing from the basic scope thereof, and the scope thereof is determined by the claims that follow.

The invention claimed is:

1. A computer-implemented method for improved part authentication, comprising:
  acquiring information related to a part, wherein the information comprises:
    identification information of the part; and
    a unique code;
  applying a stored algorithm to the identification information;
  determining whether the unique code comprises a result of applying the stored algorithm to the identification information; and
  responsive to determining that the unique code comprises the result of applying the stored algorithm to the identification information, activating a feature of the part or a feature of process equipment associated with the part.

2. The computer-implemented method of claim 1, further comprising: upon determining that the unique code does not comprise the result of applying the stored algorithm to the identification information of the part, notifying a user that authentication has failed.

3. The method of claim 1, wherein the identification information comprises one or more of the following: a serial number; a date; and a supplier identifier.

4. The method of claim 1, wherein acquiring the information related to the part comprises: scanning a bar code associated with the part.

5. The method of claim 1, further comprising:
  storing the unique code as an authenticated code;
  acquiring second information related to a second part, wherein the second information comprises:
    second identification information of the second part; and
    a second unique code;
  upon determining that the second unique code matches the stored authenticated code, notifying a user that authentication has failed.

6. The method of claim 1, wherein the stored algorithm comprises a hash function.

7. The method of claim 1, wherein the feature of the part relates to enhanced performance of the part.

8. The method of claim 1, wherein the part does not have an internal memory.

9. The method of claim 1, wherein the information is acquired from a label affixed to the part.

10. A computing system, comprising:
  a memory storing instructions; and
  a processor to execute the instructions, the instructions when executed by the processor causing the processor to perform a method for improved part authentication, the method comprising:
    acquiring information related to a part, wherein the information comprises:
      identification information of the part; and
      a unique code;
    applying a stored algorithm to the identification information;
    determining whether the unique code comprises a result of applying the stored algorithm to the identification information; and
    responsive to determining that the unique code comprises the result of applying the stored algorithm to the identification information, activating a feature of the part or a feature of process equipment associated with the part.

11. The computing system of claim 10, wherein the method further comprises: upon determining that the unique code does not comprise the result of applying the stored algorithm to the identification information of the part, notifying a user that authentication has failed.

12. The computing system of claim 10, wherein the identification information comprises one or more of the following: a serial number; a date; and a supplier identifier.

13. The computing system of claim 10, wherein acquiring the information related to the part comprises: scanning a bar code associated with the part.

14. The computing system of claim 10, wherein the method further comprises:
  storing the unique code as an authenticated code;
  acquiring second information related to a second part, wherein the second information comprises:
    second identification information of the second part; and
    a second unique code;
  upon determining that the second unique code matches the stored authenticated code, notifying a user that authentication has failed.

15. The computing system of claim 10, wherein the stored algorithm comprises a hash function.

16. The computing system of claim 10, wherein the feature of the part relates to enhanced performance of the part.

17. The computing system of claim 10, wherein the part does not have an internal memory.

18. The computing system of claim 10, wherein the information is acquired from a label affixed to the part.

19. A non-transitory computer-readable medium comprising instructions that when executed by a computing device cause the computing device to perform a method for improved part authentication, the method comprising:
   acquiring information related to a part, wherein the information comprises:
   identification information of the part; and
   a unique code;
   applying a stored algorithm to the identification information;
   determining whether the unique code comprises a result of applying the stored algorithm to the identification information; and
   responsive to determining that the unique code comprises the result of applying the stored algorithm to the identification information, activating a feature of the part or a feature of process equipment associated with the part.

20. The non-transitory computer-readable medium of claim 19, wherein the method further comprises: upon determining that the unique code does not comprise the result of applying the stored algorithm to the identification information of the part, notifying a user that authentication has failed.

\* \* \* \* \*